(12) United States Patent
Endo

(10) Patent No.: US 8,978,421 B2
(45) Date of Patent: Mar. 17, 2015

(54) MUFFLE TUBE INSPECTION METHOD AND MANUFACTURING METHOD OF SILICA GLASS-BASED OPTICAL FIBER PREFORM

(71) Applicant: Fujikura Ltd., Koto-ku, Tokyo (JP)

(72) Inventor: Sho Endo, Sakura (JP)

(73) Assignee: Fujikura Ltd., Tokyo (JP)

( * ) Notice: Subject to any disclaimer, the term of this patent is extended or adjusted under 35 U.S.C. 154(b) by 155 days.

(21) Appl. No.: 13/710,672

(22) Filed: Dec. 11, 2012

(65) Prior Publication Data

US 2013/0098116 A1    Apr. 25, 2013

Related U.S. Application Data

(63) Continuation of application No. PCT/JP2011/065004, filed on Jun. 30, 2011.

(30) Foreign Application Priority Data

Jun. 30, 2010    (JP) ................................. 2010-149159

(51) Int. Cl.
- *C03B 37/014* (2006.01)
- *C03B 37/012* (2006.01)
- *G01M 3/28* (2006.01)

(52) U.S. Cl.
CPC ......... *G01M 3/2846* (2013.01); *C03B 37/0146* (2013.01)
USPC ............................................. 65/426; 65/427

(58) Field of Classification Search
CPC .................................................. C03B 37/0146
USPC ..................................................... 65/426, 427
See application file for complete search history.

(56) References Cited

U.S. PATENT DOCUMENTS

2008/0202166 A1*    8/2008    Ishida et al. .................... 65/102

FOREIGN PATENT DOCUMENTS

| JP | 5-78140 A | 3/1993 |
|---|---|---|
| JP | 6-127964 A | 5/1994 |
| JP | 11-1337 A | 1/1999 |
| JP | 2000-169173 A | 6/2000 |
| JP | 2000-226224 A | 8/2000 |
| JP | 2005-194173 A | 7/2005 |

OTHER PUBLICATIONS

JP06-127964 machine translation performed Jul. 9, 2014.*
JP11-001337 Machine translation performed Jul. 9, 2014.*
International Search Report for PCT/JP2011/065004 dated Sep. 20, 2011.

* cited by examiner

*Primary Examiner* — Lisa Herring
(74) *Attorney, Agent, or Firm* — Sughrue Mion, PLLC

(57) ABSTRACT

A muffle tube inspection method inspects a muffle tube used for dehydrating and sintering a silica glass-based optical fiber preform, the muffle tube includes a sintering furnace provided with a furnace body covering a heater disposed around a periphery of the muffle tube. The method detects a crack generated at the muffle tube by measuring a pressure inside the furnace body while varying a pressure inside the muffle tube.

7 Claims, 2 Drawing Sheets

MUFFLE TUBE INSPECTION METHOD AND MANUFACTURING METHOD OF SILICA GLASS-BASED OPTICAL FIBER PREFORM

CROSS REFERENCE TO RELATED APPLICATIONS

This application is a continuation application based on a PCT Patent Application No. PCT/JP2011/065004, filed Jun. 30, 2011, whose priority is claimed on Japanese Patent Application No. 2010-149159, filed Jun. 30, 2010, the entire content of which are hereby incorporated by reference.

BACKGROUND OF THE INVENTION

1. Field of the Invention

The present invention relates to a muffle tube inspection method for detecting a crack generated at a muffle tube constituting a sintering furnace performing dehydration and sintering when manufacturing a silica glass-based optical fiber preform, and a manufacturing method of a silica glass-based optical fiber preform including an inspection step using the inspection method.

2. Description of the Related Art

Generally, a silica glass-based optical fiber is manufactured in a manner such that a porous preform produced by a VAD (Vapor phase Axial Deposition) method or an OVD (Outside Vapor Deposition) method is subjected to a high temperature heat-treatment, a transparent glass body is thereby formed, and the transparent glass body is fiber-drawn.

A step of forming a transparent glass body so that the porous preform is subjected to a high temperature heat-treatment is a dehydration and sintering step.

Conventionally, the dehydration and sintering step is carried out using a sintering furnace 100 as shown in FIG. 3.

The sintering furnace 100 is substantially configured to include a removable lid 101, a muffle tube 102 made of silica glass, a heater 103 placed around the periphery of the muffle tube 102, and a furnace body 104 covering the heater 103 and shutting external air out.

In the dehydration and sintering step, it is necessary to heat up the inside of the muffle tube 102 to approximately 1500° C. to form the porous preform to be a transparent glass, however, the muffle tube 102 becomes soft at the temperature.

Consequently, when there is significant difference between the inner pressure and the external pressure of the muffle tube 102, the muffle tube 102 sometimes deforms.

For this reason, in order to measure differential pressure between inner pressures of the muffle tube 102 and the furnace body 104 and atmospheric pressure (external pressure), an inner-pressure gauge 105 measuring the inner pressure thereof is provided at the muffle tube 102, and inner-pressure gauge 106 measuring the inner pressure is provided at the furnace body 104.

Additionally, a balloon shaped pressure-adjustment device 107 for adjusting the inner pressure of the muffle tube 102 based on the measuring results of the above-described differential pressure is provided at the upper portion of the muffle tube 102 (for example, refer to Japanese Unexamined Patent Application, First Publication No. 2000-169173 and Japanese Unexamined Patent Application, First Publication No. 2005-194173).

Additionally, a weight 108 pressing the pressure-adjustment device 107 by the weight thereof to adjust the inner pressure of the muffle tube 102 is mounted on the balloon-shaped pressure-adjustment device 107.

In the dehydration and sintering step using the sintering furnace 100, a porous preform 201 supported by a support rod 202 is inserted into the inside of the muffle tube 102 from above thereof.

Thereafter, in order to dehydrate the porous preform 201 or remove impurities, helium, halogen series gases, or the like is introduced into the muffle tube 102 through a gas supply port 109 that is connected to a bottom portion of the muffle tube 102 and communicated with the inside thereof, and the inside of the muffle tube 102 becomes a mixed gas atmosphere including helium, halogen series gases, or the like.

Subsequently, the heater 103 heats up the porous preform 201 from the bottom portion thereof toward the upper portion thereof by moving downward the porous preform 201 to a lower side of the muffle tube 102 while rotating the support rod 202 as the central axis.

Accordingly, the dehydration of the porous preform 201 is carried out from the bottom portion thereof toward the upper portion thereof, and a transparent glass is formed.

Furthermore, an inert gas such as helium gas, argon gas, or the like is introduced into the furnace body 104 through a gas supply port 110 that is provided at a side face of the furnace body 104 and communicated with the inside thereof.

Next, the inert gas that was introduced into the furnace body 104 is discharged to an exterior through a gas exhaust 111 that is provided a side face of the furnace body 104 and communicated with the inside thereof.

As stated above, the inside of the furnace body 104 is in an inert gas atmosphere by introducing the gas into the furnace body 104 and discharging the gas.

However, when a cracked muffle tube 102 is used in the dehydration and sintering step, a dehydration defect of the porous preform 201 may occur, or impurities generated from the heater 103 or the like may be introduced into the porous preform 201.

Because of this, transmission characteristics of the optical fiber manufactured by fiber drawing from the resultant transparent glass body becomes deteriorated.

Additionally, in the case of using a halogen series gas such as chlorine, fluorine, or the like, if the gas leaks outside the muffle tube 102, safety or workability loses.

For this reason, a sintering furnace in which a gas detecting sensor detecting helium, halogen series gases, or the like is provided at the furnace body is proposed in order to detect a crack generated at a muffle tube in the dehydration and sintering step (for example, refer to Japanese Unexamined Patent Application, First Publication No. H5-78140, Japanese Unexamined Patent Application, First Publication No. H11-1337, and Japanese Unexamined Patent Application, First Publication No. 2000-226224).

Such sintering furnace can detect a crack generated at a muffle tube when the gas to be detected flows in the muffle tube, particularly, only when dehydration and sintering are carried out.

However, there is a concern that muffle tube is cracked not only when the dehydration and sintering is carried out but also when the muffle tube is cooled down after completion of sintering the porous preform, or due to an external factor such as an earthquake or the like.

Particularly, in the muffle tube, the portion surrounded by the heater, at which difference in temperature between the case of performing dehydration and sintering and the case of not performing dehydration and sintering is large, is easily cracked.

If the dehydration and sintering step begins without being aware of a cracked muffle tube, there are problems in that, as above-described, a dehydration defect in the porous preform occurs in the dehydration and sintering step or impurities generated from the heater or the like is introduced into the porous preform.

SUMMARY OF THE INVENTION

The invention was conceived in view of the above-described circumstances and it is an object thereof to provide a muffle tube inspection method, which can detect a crack generated at a muffle tube constituting a sintering furnace used for dehydrating and sintering the preform before performing dehydration and sintering of the silica glass-based optical fiber preform or during the dehydration and sintering of the silica glass-based optical fiber preform, and a manufacturing method of a silica glass-based optical fiber preform including an inspection step using the inspection method.

A muffle tube inspection method related to a first aspect of the invention inspects a muffle tube used for dehydrating and sintering a silica glass-based optical fiber preform. The muffle tube includes a sintering furnace provided with a furnace body covering a heater disposed around the periphery of the muffle tube. The method detects a crack generated at the muffle tube by measuring a pressure inside the furnace body while varying a pressure inside the muffle tube.

In the above-described muffle tube inspection method related to the first aspect of the invention, the variation in the pressure inside the muffle tube may be carried out by increasing the flow rate of an inert gas flowing in the muffle tube or reducing a discharge amount of an inert gas from the muffle tube.

The above-described muffle tube inspection method related to the first aspect of the invention may adopt a constitution in which the increase in the flow rate of an inert gas flowing in the muffle tube is carried out by placing a weight on a balloon-shaped pressure-adjustment device provided at a gas exhaust of the muffle tube or by pressing the pressure-adjustment device by hand.

In the above-described muffle tube inspection method related to the first aspect of the invention, the reduction in the discharge amount of an inert gas from the muffle tube may be carried out by using a valve provided at the gas exhaust of the muffle tube.

In the above-described muffle tube inspection method related to the first aspect of the invention, the variation in the pressure inside the muffle tube may be carried out by adjusting an amount of an inert gas applied to the muffle tube using a mass-flow controller or a flow monitor having a valve, which is provided at a gas supply port of the muffle tube.

A manufacturing method of a silica glass-based optical fiber preform related to a second aspect of the invention includes: a muffle tube inspection step using the above-described muffle tube inspection method related to the first aspect of the invention.

Effects of the Invention

According to the above-described muffle tube inspection method related to the first aspect of the invention, it is possible to detect a crack generated at a muffle tube by making the inner pressure of the muffle tube high with the intention thereof.

Furthermore, since the crack generated at a muffle tube is detected by action of variation in the inner pressure of the furnace body disposed around the periphery of the muffle tube, it is possible to reliably detect a crack generated at a muffle tube without visually checking the muffle tube.

Therefore, since it is not necessary to use a cracked muffle tube in the step of dehydrating and sintering a preform, it is possible to improve a process yield without wasting a preform (porous preform).

DETAILED DESCRIPTION OF THE PREFERRED EMBODIMENTS

A muffle tube inspection method and a manufacturing method of a silica glass-based optical fiber preform related to an embodiment of the invention will be described.

The embodiment is specifically explained for appropriate understanding the scope of the present invention, and does not limit the present invention unless otherwise specified.

(1) First Embodiment

Figure 1:
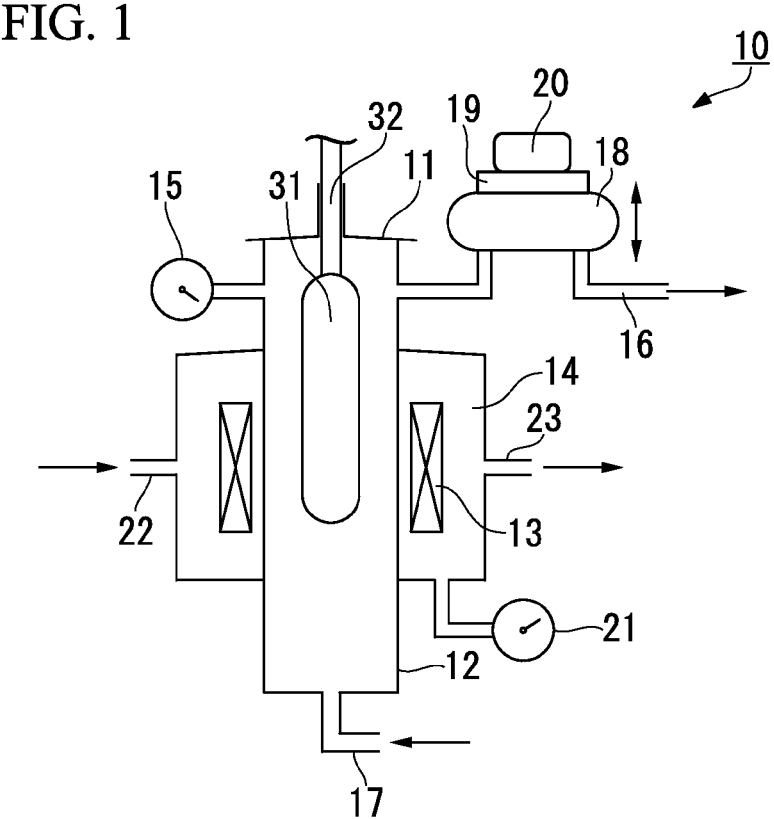
FIG. 1 is a schematic diagram illustrating a muffle tube inspection method related to a first embodiment of the invention and a sintering furnace used in a manufacturing method of a silica glass-based optical fiber preform related to a first embodiment of the invention.

FIG. 1 is a schematic diagram illustrating a muffle tube inspection method related to a first embodiment of the invention and a sintering furnace used in a manufacturing method of a silica glass-based optical fiber preform related to a first embodiment of the invention.

The sintering furnace 10 is substantially configured to include a removable lid 11, a muffle tube 12 made of silica glass, a heater 13 disposed around the periphery of the muffle tube 12, and a furnace body 14 which is disposed around the periphery of the muffle tube 12 and covers the heater 13 so as to shut external air out.

An inner-pressure gauge 15 measuring the inner pressure and a gas exhaust 16 discharging a gas from the inside thereof are provided at an upper portion of the muffle tube 12.

In addition, at a bottom portion of the muffle tube 12, a gas supply port 17 communicated with the inside thereof is provided.

A balloon-shaped pressure-adjustment device 18 is provided at midstream of the gas exhaust 16.

Moreover, a weight 19 pressing the pressure-adjustment device 18 and adjusting the pressure inside the muffle tube 12 by the weight thereof and a weight 20 used for increasing the inside-pressure are mounted on the pressure-adjustment device 18 in this order.

An inner-pressure gauge 21 measuring the inner pressure is provided at the lower portion of the furnace body 14.

Furthermore, at the side face of the furnace body 14, a gas supply port 22 and a gas exhaust 23, which communicate thereto, are provided.

As the balloon-shaped pressure-adjustment device 18, a pouch is used which is formed by folding one sheet and adhering the end portion thereof, which has two holes on a sheet surface. One of the holes is connected to the pipe which is communicated with the muffle tube 12, and the other of the holes is connected to the gas exhaust 16.

Since an acidic gas such as chlorine or fluorine may flow in the muffle tube 12, it is preferable that a material used to form the pressure-adjustment device 18 be an acid-resistant material such as polytetrafluoroethylene, polyvinyl fluoride, or the like.

The relationship between the weight 19 and the inside-pressure increasing weight 20 is not particularly limited, however the weight 19 has the mass necessary for maintaining the inner pressure of the muffle tube 12 to be a normal state.

On the other hand, the weight 20 has the mass necessary for increasing the pressure inside the muffle tube 12 to be a predetermined internal pressure when detecting a crack of the muffle tube 12.

In the dehydrating and sintering the silica glass-based optical fiber preform using the sintering furnace 10, the silica glass-based optical fiber preform (porous preform) 31 supported by the support rod 32 is inserted from above the muffle tube 12 thereinto.

The muffle tube inspection method of the embodiment is a method for inspecting the muffle tube 12 constituting the sintering furnace 10 used for dehydrating and sintering the preform 31. Before dehydrating and sintering of the preform 31, the method measures the inner pressure of the furnace body 14 while varying the pressure inside the muffle tube 12, and detects a crack of the muffle tube 12.

In the sintering furnace 10, in addition to dehydrating and sintering the preform 31, in order to prevent an extraneous material from being introduced into the muffle tube 12 or prevent pipes or the like from being rusty, an inert gas such as helium gas, argon gas, nitrogen gas, or the like is applied to the muffle tube 12.

Particularly, it is preferable that nitrogen gas, which is inexpensive gas as compared with helium gas or the like, be applied.

Because of this, before dehydration and sintering of the preform 31, the pressure inside the muffle tube 12 is varied by increasing the flow rate of the inert gas flowing in the muffle tube 12, the inner pressure of the furnace body 14 is measured using the inner-pressure gauge 21 at this time, and a crack of the muffle tube 12 is thereby detected.

Additionally, the flow rate of the inert gas flowing in the muffle tube 12 increases by placing the weights 19 and 20 on the balloon-shaped pressure-adjustment device 18 provided at the gas exhaust 16 of the muffle tube 12.

That is, the inner pressure of the muffle tube 12 becomes high by pressing the balloon-shaped pressure-adjustment device 18 with the weights 19 and 20, and the flow rate of the inert gas flowing in the muffle tube 12 increases.

Moreover, the pressure inside the muffle tube 12 may become high by pressing the pressure-adjustment device 18 by hand without placing the weight 20 on the pressure-adjustment device 18.

At this time, it is preferable that the range of the variation in the pressure inside the muffle tube 12 is such that the inner pressure of the muffle tube 12 increases by approximately 20% to 200% of the inner pressure a normal condition, i.e., the inert gas is applied only in order to prevent an extraneous material from being introduced into the muffle tube 12 or prevent pipes or the like from being rusty.

If the muffle tube 12 is not cracked, the inert gas does not leak outside, and the pressure inside the furnace body 14 is maintained and this state is remained irrespective of the variation in the pressure inside the muffle tube 12.

In contrast, if the muffle tube 12 is cracked, the inert gas flows from the muffle tube 12 to the furnace body 14 when the inner pressure of the muffle tube 12 increases, and the pressure inside the furnace body 14 thereby increases.

As mentioned above, it is possible to detect a crack of the muffle tube 12 by measuring the inner pressure of the furnace body 14.

Additionally, since a gas may flow into the furnace body 14, the inner pressure of the furnace body 14 may slightly vary even under normal conditions.

Therefore, when the inner pressure of the furnace body 14 becomes greater than that of a normal state by 1% or more, it is preferably determined that the inner pressure of the furnace body 14 increases as a result of cracking of the muffle tube 12.

Next, a manufacturing method of a silica glass-based optical fiber preform of the embodiment will be described.

The manufacturing method of a silica glass-based optical fiber preform of the embodiment includes a muffle tube inspection step using the muffle tube inspection method of the embodiment.

Particularly, in the case where cracking of the muffle tube 12 is not detected by the muffle tube inspection method of the embodiment, pressing of the pressure-adjustment device 18 by use of the weight 20 is stopped, the inner pressure of the muffle tube 12 is restored to a normal state, the sintering furnace 10 is used as it is in the present state, and dehydration and sintering of the preform 31 are carried out.

On the other hand, in the case where a cracking of the muffle tube 12 is detected, the muffle tube 12 is substituted, the substituted muffle tube 12 is inspected again; if the cracking of the muffle tube 12 is not detected, dehydration and sintering of the preform 31 are carried out.

In the step of dehydrating and sintering the preform 31, the preform 31 supported by the support rod 32 is inserted into the muffle tube 12 from the above thereof.

Subsequently, in order to dehydrate the preform 31 and remove impurities, the inside of the muffle tube 12 into which the preform 31 is inserted is made to be a mixed gas atmosphere including helium, halogen series gases, or the like by introducing helium, halogen series gases, or the like into the muffle tube 12 from the gas supply port 17.

Consequently, the heater 13 heats up the preform 31 from the bottom portion thereof toward the upper portion thereof by moving downward the preform 31 to a lower side of the muffle tube 12 while rotating the support rod 32 as the central axis.

Therefore, the dehydration of the preform 31 is carried out from the bottom portion thereof toward the upper portion thereof, and a transparent glass is formed.

Furthermore, an inert gas helium gas, argon gas, nitrogen gas, or the like is introduced into the furnace body 14 through the gas supply port 22.

Next, the inert gas that was introduced into the furnace body 14 is discharge through the gas exhaust 23.

As described above, the inside of the furnace body 14 is in an inert gas atmosphere by introducing the gas into the furnace body 14 and discharging the gas.

(2) Second Embodiment

Figure 2:
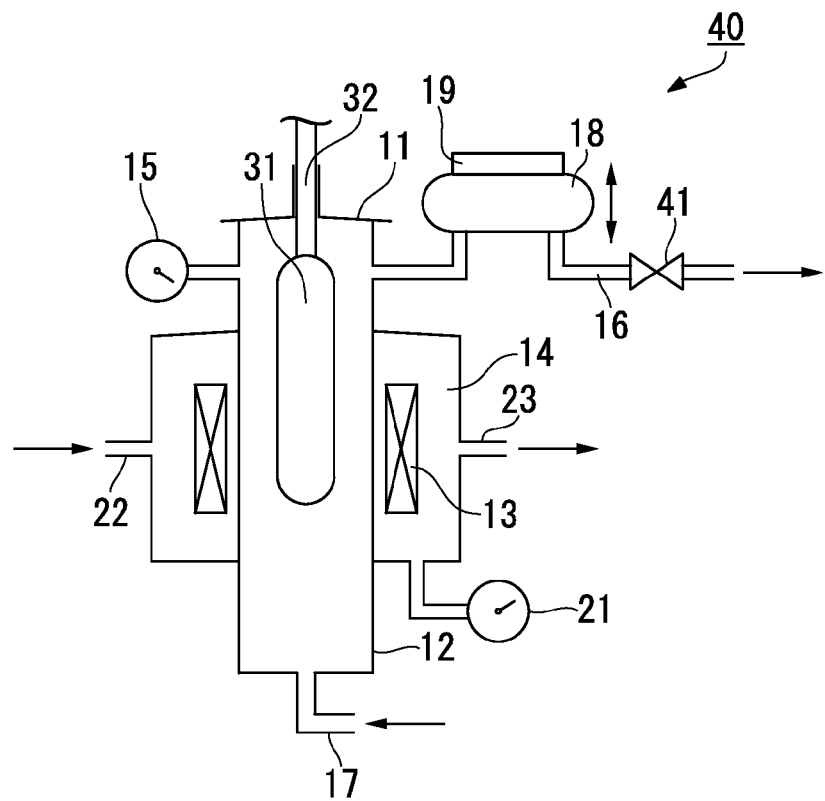
FIG. 2 is a schematic diagram illustrating a muffle tube inspection method related to a second embodiment of the invention and a sintering furnace used in a manufacturing method of a silica glass-based optical fiber preform related to a second embodiment of the invention.
Figure 3:
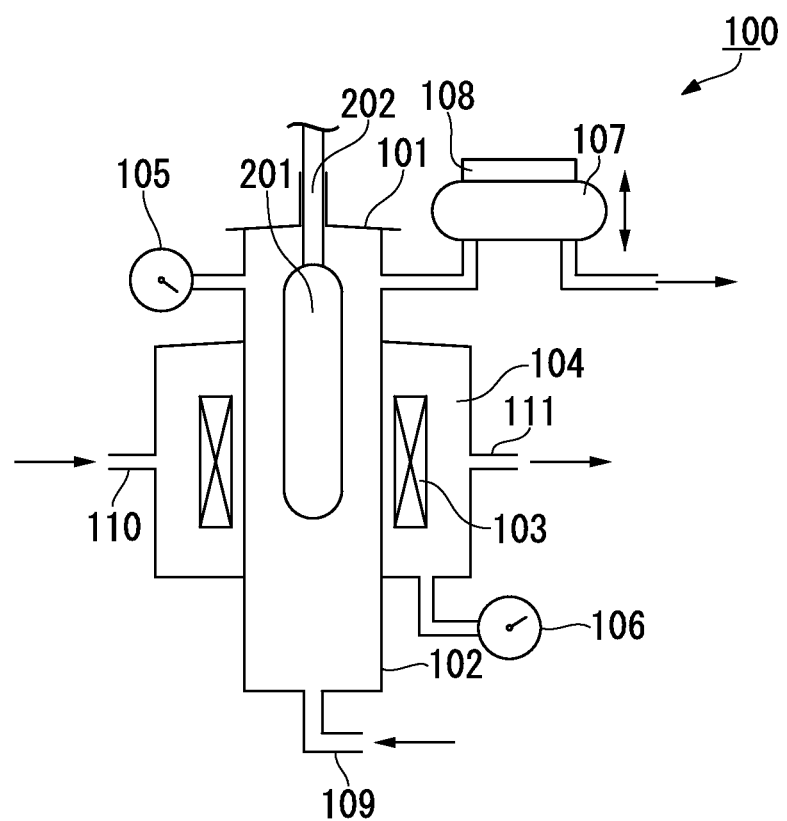
FIG. 3 is a schematic diagram illustrating a sintering furnace used in a conventional porous preform sintering method.

FIG. 2 is a schematic diagram illustrating a muffle tube inspection method related to a second embodiment of the invention and a sintering furnace used in a manufacturing method of a silica glass-based optical fiber preform related to a second embodiment of the invention.

In FIG. 2, identical symbols are used for the constituent elements which are identical to the constituent elements of the first embodiment shown in FIG. 1, and the explanations thereof are omitted or simplified.

A sintering furnace 40 of the embodiment is different from the above-described sintering furnace 10 in that the inside-pressure increasing weight 20 is not used and a valve 41 is provided at the midstream the gas exhaust 16 of the muffle tube 12.

As the valve 41, a needle valve, a ball valve, a gate valve, a glove valve, or the like is used.

In the above valves, a needle valve is preferably used because adjustment of the flow rate is easy.

In the muffle tube inspection method of the embodiment, the inner pressure of the muffle tube 12 is varied by reducing the discharge amount of the inert gas discharged from the muffle tube 12, the pressure inside the furnace body 14 at this time is measured by the inner-pressure gauge 21, and a crack of the muffle tube 12 is detected.

In addition, reduction in the discharge amount of the inert gas discharged from the muffle tube 12 is carried out by operation of the valve 41 provided at the gas exhaust 16 of the muffle tube 12.

That is, the discharge amount of the inert gas discharged from the muffle tube 12 is reduced and the inner pressure of the muffle tube 12 becomes high by adjusting an opening angle of the valve 41.

At this time, it is preferable that the range of the variation in the pressure inside the muffle tube 12 be the same as that of the first embodiment.

Additionally, similar to the first embodiment, when the inner pressure of the furnace body 14 becomes greater than that of a normal state by 1% or more, it is preferably determined that the inner pressure of the furnace body 14 increases as a result of cracking of the muffle tube 12.

According to the muffle tube inspection method of the embodiment, similar to the first embodiment, it is possible to detect a crack of the muffle tube 12.

Furthermore, the manufacturing method of a silica glass-based optical fiber preform of the embodiment includes a muffle tube inspection step using the muffle tube inspection method of the embodiment.

Particularly, in the case where cracking of the muffle tube 12 is not detected by the muffle tube inspection method of the embodiment, the valve 41 is opened, the inner pressure of the muffle tube 12 is restored to a normal state, the sintering furnace 10 is used as it is in the present state, and dehydration and sintering of the preform 31 are carried out.

On the other hand, in the case where a cracking of the muffle tube 12 is detected, the muffle tube 12 is substituted, the substituted muffle tube 12 is inspected again; if the cracking of the muffle tube 12 is not detected, dehydration and sintering of the preform 31 are carried out.

(3) Third Embodiment

In the muffle tube inspection method of the embodiment, the sintering furnace which is the same as the sintering furnace as show in, for example, FIG. 1 or FIG. 2 is used, the pressure inside the muffle tube 12 is varied by adjusting the amount of the inert gas which is supplied to the muffle tube 12 by a mass-flow controller (not shown in the figure) provided at the gas supply port 17 of the muffle tube 12, the inner pressure of the furnace body 14 is measured using the inner-pressure gauge 21 at this time, and a crack of the muffle tube 12 is thereby detected.

That is, the flow rate of the inert gas flowing in the muffle tube 12 increases by use of the mass-flow controller, the inner pressure of the muffle tube 12 becomes high, and a crack of the muffle tube 12 is thereby detected.

The mass-flow controller electrically measures the flow rate of the inert gas and controls the flow rate thereof.

However, since it is only necessary to control the flow rate, instead of the mass-flow controller, the flow rate may be manually controlled by providing, for example, an area flow meter with a valve.

At this time, it is preferable that the range of the variation in the pressure inside the muffle tube 12 be the same as that of the first embodiment.

Additionally, similar to the first embodiment, when the inner pressure of the furnace body 14 becomes greater than that of a normal state by 1% or more, it is preferably determined that the inner pressure of the furnace body 14 increases as a result of cracking of the muffle tube 12.

According to the muffle tube inspection method of the embodiment, similar to the first embodiment, it is possible to detect a crack of the muffle tube 12.

Furthermore, the manufacturing method of a silica glass-based optical fiber preform of the embodiment includes a muffle tube inspection step using the muffle tube inspection method of the embodiment.

Particularly, in the case where cracking of the muffle tube 12 is not detected by the muffle tube inspection method of the embodiment, the amount of the nitrogen gas which is supplied to the muffle tube 12 is reduced by use of the mass-flow controller, the inner pressure of the muffle tube 12 is restored to a normal state, the sintering furnace 10 is used as it is in the present state, and dehydration and sintering of the preform 31 are carried out.

On the other hand, in the case where a cracking of the muffle tube 12 is detected, the muffle tube 12 is substituted, the substituted muffle tube 12 is inspected again; if the cracking of the muffle tube 12 is not detected, dehydration and sintering of the preform 31 are carried out.

EXAMPLES

Hereinafter, the invention will be specifically described with reference to Examples, however, the invention is not limited to the below-described Examples.

Example 1

The presence or absence of cracking at the muffle tube 12 constituting the sintering furnace 10 shown in FIG. 1 was detected.

In a state where a nitrogen gas is introduced into the muffle tube 12 from the gas supply port 17 and the pressure inside the muffle tube 12 becomes constant, the inner pressure was measured by the inner-pressure gauge 15, and the pressure was 300 Pa.

At this time, only the weight 19 was mounted on the balloon-shaped pressure-adjustment device 18.

Furthermore, the pressure inside the furnace body 14 was measured by the inner-pressure gauge 21 and the pressure was 80 Pa.

Subsequently, the weight 20 having 800 g used for increasing the inside-pressure was further mounted on the pressure-adjustment device 18, the inner pressure of the muffle tube 12 was measured by the inner-pressure gauge 15, and the pressure was 400 Pa.

Moreover, the pressure inside the furnace body 14 was measured by the inner-pressure gauge 21 and the pressure was 80 Pa.

As stated above, the inner pressure of the muffle tube 12 varied from 300 Pa to 400 Pa, however, the pressure inside the furnace body 14 did not vary.

Accordingly, it was confirmed that the muffle tube 12 was not cracked.

Example 2

The presence or absence of cracking at the muffle tube 12 constituting the sintering furnace 10 shown in FIG. 1 was detected.

In a state where a nitrogen gas is introduced into the muffle tube 12 from the gas supply port 17 and the pressure inside the muffle tube 12 becomes constant, the inner pressure was measured by the inner-pressure gauge 15, and the pressure was 300 Pa.

At this time, only the weight 19 was mounted on the balloon-shaped pressure-adjustment device 18.

Furthermore, the pressure inside the furnace body 14 was measured by the inner-pressure gauge 21 and the pressure was 80 Pa.

Subsequently, the pressure-adjustment device 18 was pressed by hand, the inner pressure of the muffle tube 12 was measured by the inner-pressure gauge 15, and the pressure was 500 Pa.

Moreover, the pressure inside the furnace body 14 was measured by the inner-pressure gauge 21 and the pressure was 80 Pa.

As stated above, the inner pressure of the muffle tube 12 varied from 300 Pa to 500 Pa, however, the pressure inside the furnace body 14 did not vary.

Accordingly, it was confirmed that the muffle tube 12 was not cracked.

Example 3

The presence or absence of cracking at the muffle tube 12 constituting the sintering furnace 40 shown in FIG. 2 was detected.

In a state where a nitrogen gas is introduced into the muffle tube 12 from the gas supply port 17 and the pressure inside the muffle tube 12 becomes constant, the inner pressure was measured by the inner-pressure gauge 15, and the pressure was 300 Pa.

At this time, the weight 19 was mounted on the balloon-shaped pressure-adjustment device 18.

Furthermore, the pressure inside the furnace body 14 was measured by the inner-pressure gauge 21 and the pressure was 80 Pa.

Subsequently, the valve 41 was closed, the inner pressure of the muffle tube 12 was measured by the inner-pressure gauge 15, and the pressure was 500 Pa.

Moreover, the pressure inside the furnace body 14 was measured by the inner-pressure gauge 21 and the pressure was 80 Pa.

As stated above, the inner pressure of the muffle tube 12 varied from 300 Pa to 500 Pa, however, the pressure inside the furnace body 14 did not vary.

Accordingly, it was confirmed that the muffle tube 12 was not cracked.

Example 4

The presence or absence of cracking at the muffle tube 12 constituting the sintering furnace 10 shown in FIG. 1 or the sintering furnace 40 shown in FIG. 2 was detected.

A mass-flow controller was provided at the gas supply port 17 of the muffle tube 12.

In a state where a predetermined amount of a nitrogen gas was introduced into the muffle tube 12 from the gas supply port 17 by the mass-flow controller and the pressure inside the muffle tube 12 becomes constant, the inner pressure was measured by the inner-pressure gauge 15, and the pressure was 300 Pa.

Furthermore, the pressure inside the furnace body 14 was measured by the inner-pressure gauge 21 and the pressure was 80 Pa.

Subsequently, the amount of the nitrogen gas which was supplied to the muffle tube 12 by the mass-flow controller increased, the inner pressure of the muffle tube 12 was measured by the inner-pressure gauge 15, and the pressure was 500 Pa.

Moreover, the pressure inside the furnace body 14 was measured by the inner-pressure gauge 21 and the pressure was 80 Pa.

As stated above, the inner pressure of the muffle tube 12 varied from 300 Pa to 500 Pa, however, the pressure inside the furnace body 14 did not vary.

Accordingly, it was confirmed that the muffle tube 12 was not cracked.

Industrial Applicability

According to the muffle tube inspection method of the invention and the manufacturing method of a silica glass-based optical fiber preform including an inspection step using the inspection method, it is possible to detect a crack generated at a muffle tube constituting a sintering furnace used for dehydrating and sintering the preform before performing dehydration and sintering of the silica glass-based optical fiber preform or during the dehydration and sintering of the silica glass-based optical fiber preform.

What is claimed is:

1. A muffle tube inspection method of inspecting a muffle tube used for dehydrating and sintering a silica glass-based optical fiber preform, the muffle tube comprising a sintering furnace provided with a furnace body covering a heater disposed around a periphery of the muffle tube, the method comprising:

Increasing a flow rate of an inert gas flowing in the muffle tube or reducing a discharge amount of an inert gas from the muffle tube, thereby varying a pressure inside the muffle tube;

and detecting cracking generated at the muffle tube by measuring the pressure inside the furnace body while varying the pressure inside the muffle tube.

2. The muffle tube inspection method according to claim 1, wherein the increase in the flow rate of an inert gas flowing in the muffle tube is carried out by placing a weight on a balloon-shaped pressure-adjustment device provided at a gas exhaust of the muffle tube or by pressing the pressure-adjustment device by hand.

3. The muffle tube inspection method according to claim 1, wherein the reduction in the discharge amount of an inert gas from the muffle tube is carried out by using a valve provided at a gas exhaust of the muffle tube.

4. The muffle tube inspection method according to claim 1, wherein the variation in the pressure inside the muffle tube is carried out by adjusting an amount of an inert gas applied to the muffle tube using a mass-flow controller or a flow monitor having a valve, which is provided at a gas supply port of the muffle tube.

5. A manufacturing method of silica glass-based optical fiber preform comprising:

preparing a muffle tube comprising a sintering furnace provided with a furnace body covering a heater disposed around a periphery of the muffle tube, the muffle tube being used for dehydrating and sintering a silica glass-based optical fiber preform;

using a muffle inspection method of inspecting the muffle tube, the method comprising: increasing a flow rate of an inert gas flowing in the muffle tube or reducing a discharge amount of an inert gas from the muffle tube, thereby varying a pressure inside the muffle tube;

detecting cracking generated at the muffle tube by measuring the pressure inside the furnace body while varying the pressure inside the muffle tube; and carrying out dehydration and sintering of the silica glass-based optical fiber preform by use of the sintering furnace, wherein the silica glass-based optical fiber preform is heated up by the heater and, the silica glass-based optical fiber preform is dehydrated, and a transparent glass is thereby formed.

6. The manufacturing method of a silica glass-based optical fiber preform according to claim 5, wherein in the case where cracking of the muffle tube is not detected by the muffle tube inspection method, the increasing of the flow rate of the inert gas is stopped, the inner pressure of the muffle tube is restored to a normal state, and the dehydration and the sintering of the silica glass-based optical fiber preform are carried out.

7. The manufacturing method of a silica glass-based optical fiber preform according to claim 5, wherein in the case where cracking of the muffle tube is detected by the muffle tube inspection method, the muffle tube is substituted, and the dehydration and the sintering of the silica glass-based optical fiber preform are carried out.

* * * * *